(12) United States Patent
Teolis et al.

(10) Patent No.: US 7,409,854 B2
(45) Date of Patent: *Aug. 12, 2008

(54) METHOD AND APPARATUS FOR DETERMINING AN OPERATING STATUS OF A TURBINE ENGINE

(75) Inventors: Carole Teolis, Glen Dale, MD (US); Anthony Teolis, Glen Dale, MD (US); Christine Kim, Falls Church, VA (US)

(73) Assignee: Techno-Sciences, Inc., Beltsville, MD (US)

( * ) Notice: Subject to any disclaimer, the term of this patent is extended or adjusted under 35 U.S.C. 154(b) by 330 days.

This patent is subject to a terminal disclaimer.

(21) Appl. No.: 11/252,633

(22) Filed: Oct. 19, 2005

(65) Prior Publication Data
US 2006/0120197 A1 Jun. 8, 2006

Related U.S. Application Data

(60) Provisional application No. 60/619,953, filed on Oct. 20, 2004, provisional application No. 60/619,713, filed on Oct. 19, 2004.

(51) Int. Cl.
*G01M 15/00* (2006.01)
(52) U.S. Cl. .................................... 73/117.3
(58) Field of Classification Search ............ 73/116, 73/117.2, 117.3, 117.4, 118.1, 119 R
See application file for complete search history.

(56) References Cited

U.S. PATENT DOCUMENTS

| | | | | |
|---|---|---|---|---|
| 4,468,620 A * | 8/1984 | Vaerman | | 324/261 |
| 5,479,826 A * | 1/1996 | Twerdochlib et al. | | 73/660 |
| 5,942,893 A | 8/1999 | Terpay | | |
| 7,023,205 B1 * | 4/2006 | Krupp | | 324/239 |
| 2004/0051525 A1 * | 3/2004 | Hatcher et al. | | 324/262 |
| 2005/0200355 A1 * | 9/2005 | Hatcher et al. | | 324/239 |
| 2005/0270519 A1 * | 12/2005 | Twerdochlib | | 356/24 |
| 2006/0078193 A1 * | 4/2006 | Brummel et al. | | 382/152 |
| 2006/0097719 A1 * | 5/2006 | Moore | | 324/237 |
| 2006/0120197 A1 * | 6/2006 | Teolis et al. | | 365/226 |

OTHER PUBLICATIONS

Behnken, R. L., et al., "Control of Rotating Stall in a Low Speed Axial Flow Compressor Using Pulsed air Injection : Modeling, Simulations, and Experimental Validation" 34th Conference on Decision and Control, New Orleans, 1995.

(Continued)

*Primary Examiner*—Eric S McCall
(74) *Attorney, Agent, or Firm*—DLA Piper US LLP

(57) ABSTRACT

A method and apparatus for determining the operating condition of a turbine engine. An eddy current sensor is provided having a sensing field in communication with a plurality of rotating turbine blades during a revolution of a turbine engine. A threshold point value is defined for the signature data. A plurality of positive threshold point pairs and negative threshold point pairs are identified. A plurality of positive threshold widths from a plurality of times elapsed between the positive threshold point pairs and a plurality of negative threshold widths from a plurality of times elapsed between the negative threshold point pairs are determined. A plurality of threshold ratios are determined from a plurality of pairs of positive and negative threshold widths. A variance of the threshold ratios is correlated with an operating condition of the turbine engine.

41 Claims, 7 Drawing Sheets

OTHER PUBLICATIONS

Bright, M. M., et al. "Investigation of Pre-stall Mode and Pip Inception in High-Speed Compressors Through the Use of Correlation Integral", Journal of Turbomachinery vol. 121, pp. 743-750, 1999.

Bright, M. M., et al., "Stall Precursor Identification in High-Speed Compressor Stages Using Chaotic Time Series Methods" Journal of Turbomachinery, vol. 119 p. 491-500, Jul. 1997.

Cheng, X., et al. "Investigation on the precursor behavior of compressor rotating Stall through two-dimensional wavelet transform", Beijing, Institute of Engineering Thremophysics, Chinese Academy of Sciences, pp. 1-7, 1999.

Day, I. J. (1993). "Stall Inception in Axial Flow Compressors" Journal of Turbomachinery, vol. 115, pp. 40-47, 1993.

DeLaat, J. C., et al. "High Stability Engin Control (HISTEC)" 32nd Joint Propulsion Conference, Lake Buena Vista, FL., 1996.

DeLaat, J. C., et al.,"High Stability Engin Control (HISTEC) Program: Flight Demonstration Phase" 34nd Joint Propulsion Conference, Cleveland, OH, 1998.

DeLaat, J. C., R., et al., "High Stability Engin Control (HISTEC) Program: Flight Test Results". 34nd Joint Propulsion Conference, Cleveland, OH, 1998.

Eveker. K., et al., "Integrated Control Of Rotating Stall and Surge in High-Speed Multistage Compression Systems" Journal of Turbomachinery, vol. 120, pp. 440-445, 1998.

Greitzer, E. M., et al., "A Theory of Post Stall Transients In Axial Compression Systems: Part II-Applications" Journal of Engineering for Gas Turbines and Power, vol. 108 pp. 231-239, 1986.

Hynes, T. P., et al., "A Method for assessing effects of circumferential flow distortion on compressor stability" ASME Journal of Turbomachinery vol. 109 pp. 371-379, 1987.

Liaw, D. C., et al., "Active Control of Compressor Stall Inception: a Bifurcation Theoretic Approach" Automatica vol. 32 (1), pp. 109-115, 1996.

Moore, F. K., "A Theory of Post Stall Transients in Axial Compression Systems: Part 1-Development of Equations" Journal of Engineering for Gas Turbines and Power vol. 108 pp. 68-76, 1986.

Paduano, J. D., et al., "Compressor Stability and Control: Review and pratical Implications" ASME Journal of Turbomachinery vol. 115 pp. 48-56, 1993.

Van Schalkwyk, C. M., et al., "Active Stabilization of Axial Compressors with Circumferential Inlet Distortion". ASME Journal of Turbomachinery vol. 120. 431-439, 1998.

Dowell, M., et al., "Progress in Turbomachinery Prognostics and Health Management via Eddy-Current Sensing" pp. 133-143, IEEE 2000.

Dowell, M., et al., "Turbomachinery Prognostics and Health Management via Eddy Current Sensing Current Developments" 1-9, undated.

Yeung, S., et al., "Nonlinear Control of Rotating Stall Using Axisymmetric Bleed With Continous Air Injection On A Low-Speed, Single Stage, Axial Compressor" Joint Propulsion Conference pp. 1-9, 1997.

Yeung, S., et al., "Reduction of Bleed Valve Rate Requirements for Control of rotating Stall Using Continuous Air Injection" Proceedings of the 1997 IEEE International Conference on Control Applications, vols. 5-7, pp. 683-690, 1997.

Mercadal, M., et al., "Detecting Turbomachinery Stall With Blade Tip Sensors" IEEEAC paper No. 310 pp. 1-8, 2001.

Von Flotow, A.,et al., "Health Monitoring and Prognostics of Blades and Disks with Blade Tip Sensors", pp. 433-440, IEEE 2000.

Tryfonidis, M., et al., "Prestall Behavior of Several High-Speed Compressors" Transactions of the ASME, vol. 117, pp. 62-80, 1995.

Suder, K., et al., "Compressor Stability Enhancement using Discrete Tip Injection" Proceedings of ASME Turboexpo, pp. 1-13, 2000-GT-650.

Teolis, C., "Eddy Current Sensor Signal Processing for Stall Detection", pp. 1-17, IEEE 2005.

* cited by examiner

METHOD AND APPARATUS FOR DETERMINING AN OPERATING STATUS OF A TURBINE ENGINE

CROSS-REFERENCE TO RELATED APPLICATIONS

This application claims priority from U.S. Provisional Application Ser. No. 60/619,713 filed Oct. 19, 2004 and U.S. Provisional Application Ser. No. 60/619,953 filed Oct. 20, 2004. The entirety of these provisional applications is incorporated herein by reference.

FIELD

The invention relates generally to the field of turbine engine monitoring, and more specifically to utilizing an eddy current sensor for turbine engine monitoring.

BACKGROUND

High response pressure sensors are commonly used for stall detection in research gas turbine engines. However, these pressure sensors are typically not well suited for permanent installation in engines intended for field usage. As such, a method is needed for determining the operating condition of a turbine engine that is suitable for both research and field implementations.

SUMMARY

The invention relates to methods and apparatuses for determining an operating condition of a turbine engine using a sensor having a sensing field in communication with a plurality of rotating turbine blades during a revolution of a turbine engine. Preferred embodiments utilize an eddy current sensor. In one method, a threshold point value is defined for the signature data. A plurality of positive threshold point pairs and negative threshold point pairs are identified. A plurality of positive threshold widths from a plurality of times elapsed between the positive threshold point pairs and a plurality of negative threshold widths from a plurality of times elapsed between the negative threshold point pairs are determined. A plurality of threshold ratios are determined from the plurality of pairs of positive and negative threshold widths. A variance of the threshold ratios is correlated with an operating condition of the turbine engine.

In another method, waveform data from the eddy current sensor is converted to the frequency domain using a technique such as a Fast Fourier Transform (FFT). A local maxima of the data in the frequency domain is identified. This local maxima corresponds to a harmonic. In preferred embodiments, the third harmonic is selected but other harmonics may also be used. A window of data around the identified local maxima is selected and this data is converted back to the time domain using a technique such as an inverse FFT, yielding complex time domain data. The instantaneous frequency of the complex time domain data is then calculated, and the derivative of the instantaneous frequency forms the stall detector output.

BRIEF DESCRIPTION OF THE DRAWINGS

A more complete appreciation of the various embodiments will be readily obtained by reference to the following detailed description when considered in conjunction with the accompanying drawings, wherein.

DETAILED DESCRIPTION OF SEVERAL EMBODIMENTS

Figure 1:
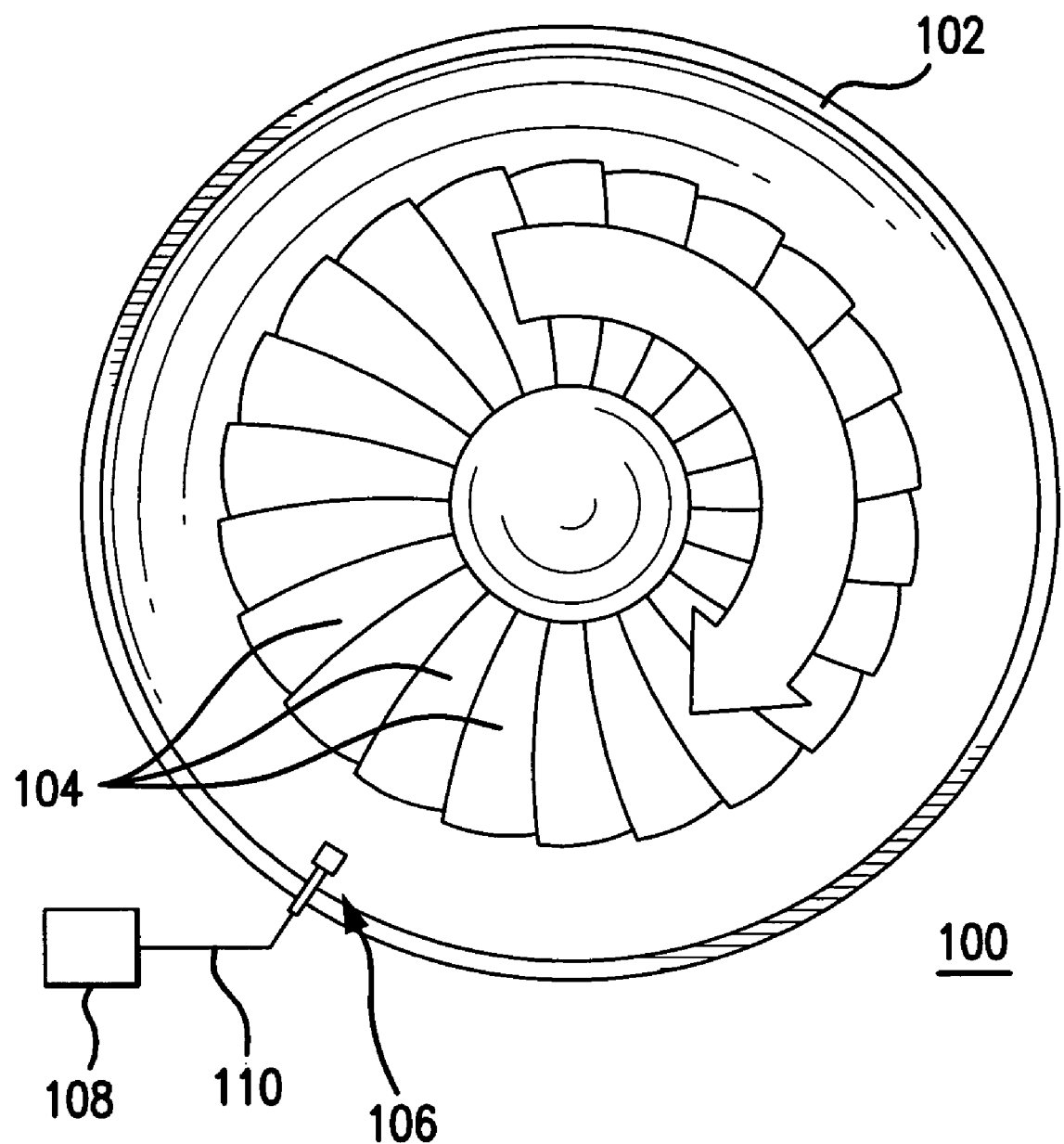
FIG. 1 illustrates a turbine engine according to embodiments of the invention.

In the figures, in which like reference numerals indicate like elements, there is shown a method of determining the operating condition of a turbine engine. The determination of the operating condition of a turbine engine is useful to engineers during the initial development of an engine and in the later health monitoring of in-service engines. In particular, the ability to determine an engine event such as a stall or surge condition at an early stage of the event or prior to the event (e.g., to potentially prevent the event from occurring) is useful to engine designers and operators for improving their understanding of destabilizing factors which directly affect engine performance. As such, the embodiments herein are useful for maximizing turbine engine performance and safety.

FIG. 1 illustrates a turbine engine 100 comprising a housing 102, a plurality of turbine blades 104 and an eddy current sensor (ECS) 106 which may be in communication with the housing 102. The ECS 106 includes an electromagnetic sensing field in communication with the plurality of turbine blades 104. In alternative embodiments, other types of sensors, such as a pressure sensor, an optical sensor, a radar sensor, a microwave sensor, or a capacitive sensor, may be utilized in place of the ECS 106. However, an ECS has several properties that make it particularly well suited for the embodiments herein: immunity to changes in gas stream properties, adaptability to the extreme temperature environment of a turbine engine compressor stage, relatively low power consumption, low cost, and ease of installation in association with turbine blades for field operational engines. Moreover, ECS can detect blade clearance in addition to stall, whereas a pressure sensor is really only suited for stall detection. Capacitive sensors have the undesirable property of being affected by changes in gas stream properties; for example, more moisture in the air changes the dielectric constant of the air and thus the capacitance measurement (and therefore the sensor output) is changed. In contrast, an ECS is unaffected by such changes.

In the various embodiments described below, the ECS 106 generates blade signature data for the passage of each blade 104 during a revolution of the turbine engine 100 to determine an engine operation condition such as, for example, a stall, pre-stall or surge condition. The blade signature data may be further utilized to determine various blade conditions. Blade conditions may include, for example, vibration, pitch angle, thickness, tip clearance, and mode shape. A processor 108, that may be a component within the ECS 106 or be located remotely from the ECS 106, may receive data either internally or via a real-time communication link 110 from the ECS 106 based on the selected configuration. The processor 108 may be programmed to perform various operations to determine an operating condition of the engine 100, as will be described in more detail below. While various embodiments herein are described as being performed by the processor 108, it should be understood that such descriptions may be simplified for ease of understanding. One skilled in the art will note that the various steps may be implemented by a single processing device or by a plurality of processing devices working independently or in conjunction with each other. Further, the processing aspects of the various embodiments may be implemented by any combination of hardware, software and/or firmware.

As used herein, a turbine engine 100 is defined as an engine comprising a plurality of blades generally arranged in a circular fan configuration and having one or more compression stages. A turbine engine 100 may include, for example, a gas turbine engine for powering an airplane, helicopter or spacecraft; a land-based vehicle such as a turbine powered automobile or train; a water-based vehicle such as a hovercraft, turbine-powered ship; or a gas turbine engine for power generation. An operating condition of the turbine engine may comprise blade conditions such as vibration, tip clearance, damaged or missing blades which may be indicative of engine acceleration, deceleration, "stall cells" such as rotating stall, flutter (aerodynamically induced blade vibration) and/or surge conditions.

In the following embodiments, various methods are described for determining the occurrence of a pre-stall engine condition. However, the methods described herein may also be adapted for the detection of various other engine operating conditions. Therefore, this description should not be limited as being useful only for determining pre-stall conditions.

Figure 7A:
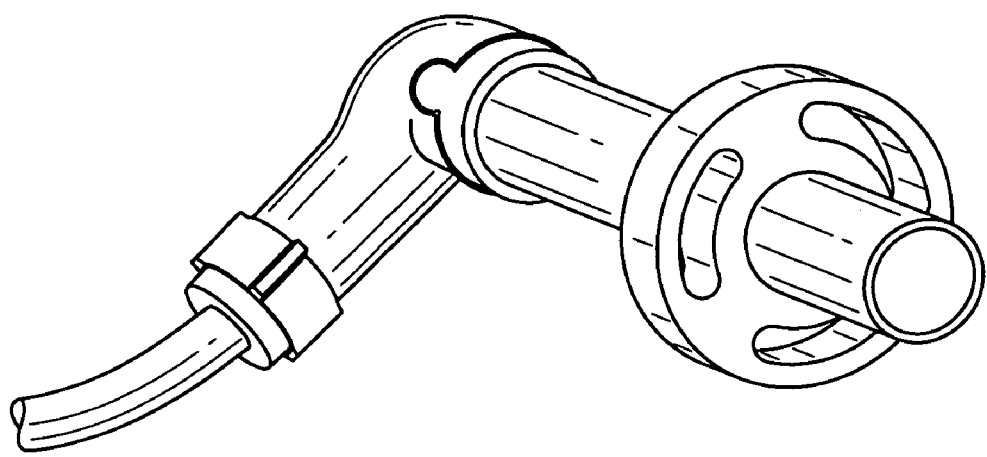
FIGS. 7a and 7b illustrates perspective and schematic views, respectively, of a two pole eddy current sensor utilized in some embodiments of the invention.
Figure 7B:
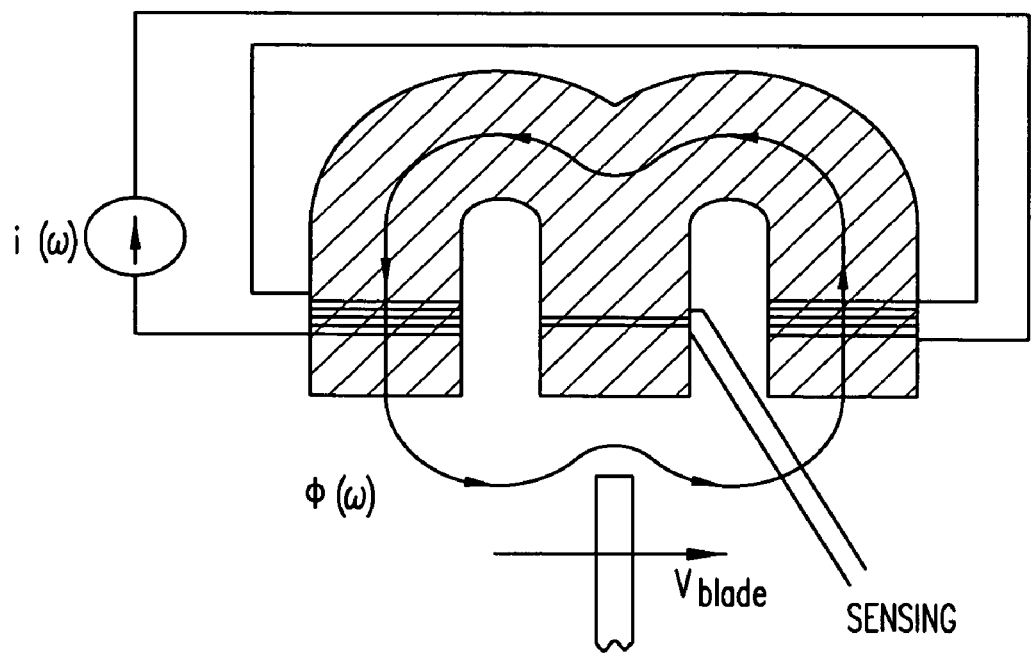

One eddy current sensor with which the invention may be practiced is the two pole (also referred to as a three leg) General Dynamics (GDAIS) ECS illustrated in FIGS. 7a and 7b. It should be understood that the invention my also be practiced with single pole eddy current sensors, in which case the signature data will include only a single "lobe" rather than the positive and negative lobes shown in FIG. 2.

Figure 2:
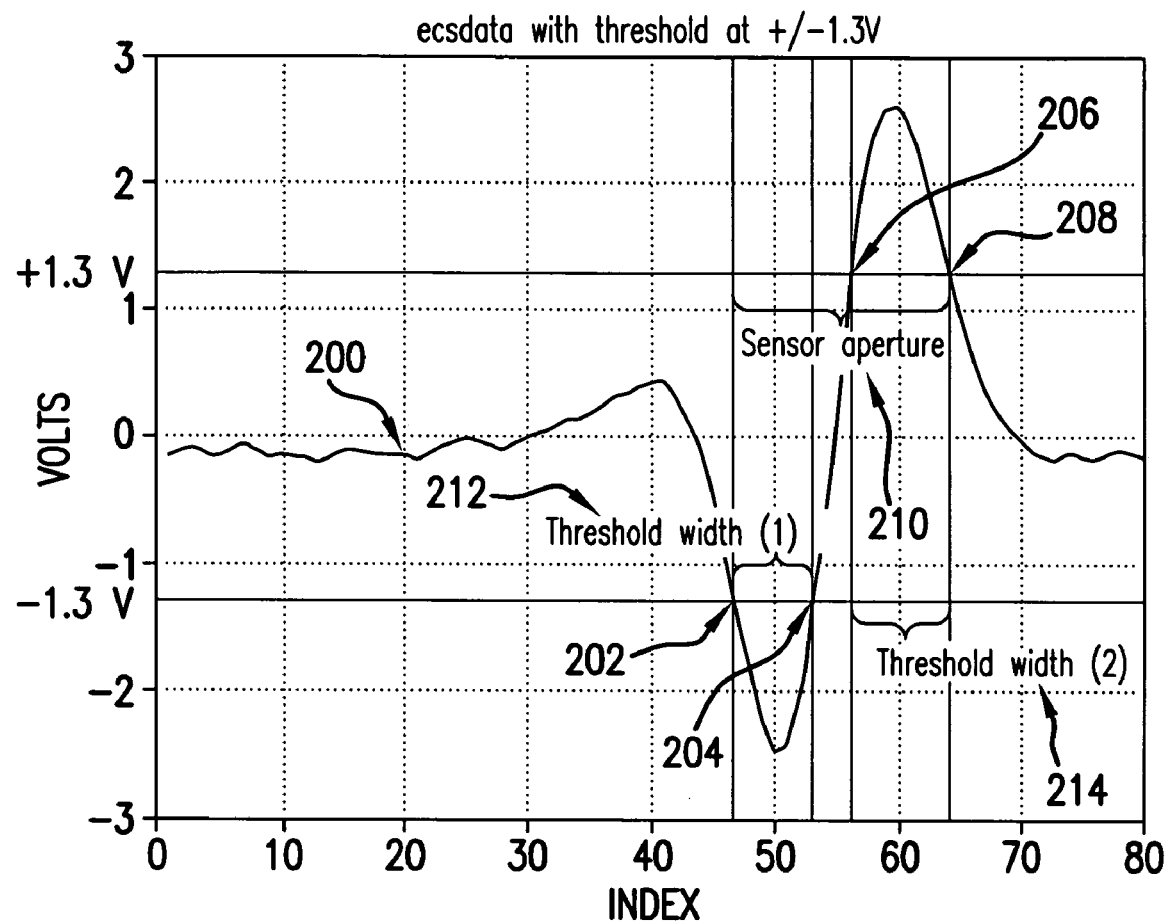
FIG. 2 illustrates a graphical representation of an eddy current sensor signal for the passage of a blade of a turbine engine according to embodiments of the invention.

As shown in FIG. 2, a two pole eddy current sensor (ECS) signature 200 for the passage of a blade of a turbine engine can be represented graphically as having four threshold points; two points corresponding to the negative threshold value, 202 and 204 respectively, and two points corresponding to the positive threshold value, 206 and 208 respectively. (In embodiments using a single pole ECS, there will only be a single pair of threshold points.) The threshold points define the boundary of a sensor aperture 210, which is described below. A threshold point is defined as a point where the absolute value of the sensor signature crosses the threshold, where the threshold is a positive real number. In alternative embodiments, extrema points and zero crossing points may be used as data reference points in place of threshold points. However, threshold points are preferred due to their ease of detection using hardware relative to these alternative reference points.

In one embodiment, the time elapsed between the positive and negative threshold points, 202 and 204, defines a positive threshold width 212 and the time elapsed between the third and fourth threshold widths, 206 and 208, defines a negative threshold width 214. In various embodiments, the threshold widths 206 and 208, as well as other functions that are associated with the threshold widths such as, for example, the difference between threshold widths or the ratio between threshold widths, are good indications of engine operating conditions. In particular, it has been observed that threshold widths vary with the onset of engine stall or surge conditions. Therefore, the onset of these conditions can be detected by monitoring threshold width. Further, various functions of the threshold widths may also be useful for sensing other phenomena including the blade signature data discussed above.

It should be noted that the monitoring of the threshold width is applicable to single pole sensors (such as single pole ECSs) as well as two pole eddy current sensors. In a single pole sensor embodiment (or even in a 2 pole eddy current sensor embodiment), it will not, of course, be possible to compare a positive threshold width to a negative threshold width. However, it is possible to compare a measured threshold width for a particular blade passages obtained with a single pole sensor to measured threshold widths from previous blade passage or to a nominal threshold width for a given engine rotation speed (which may be obtained from a look up table populated with historical data). In such embodiments, a moving window filtered threshold width may be used for the aforementioned comparison. Trends in threshold widths may then be monitored in a manner similar to that discussed below in connection with threshold width ratios.

A sensor aperture 210 is defined as the time elapsed between the first threshold point 202 and the last threshold point 208. It has been observed that the sensor aperture 210 varies during an engine stall or pre-stall event. For example, an increase in the magnitude of the sensor aperture 210 may be indicative of an imminent stall event. As such, an observed increase in sensor aperture 210 may be used to determine the operating condition of a turbine engine.

Figure 3:
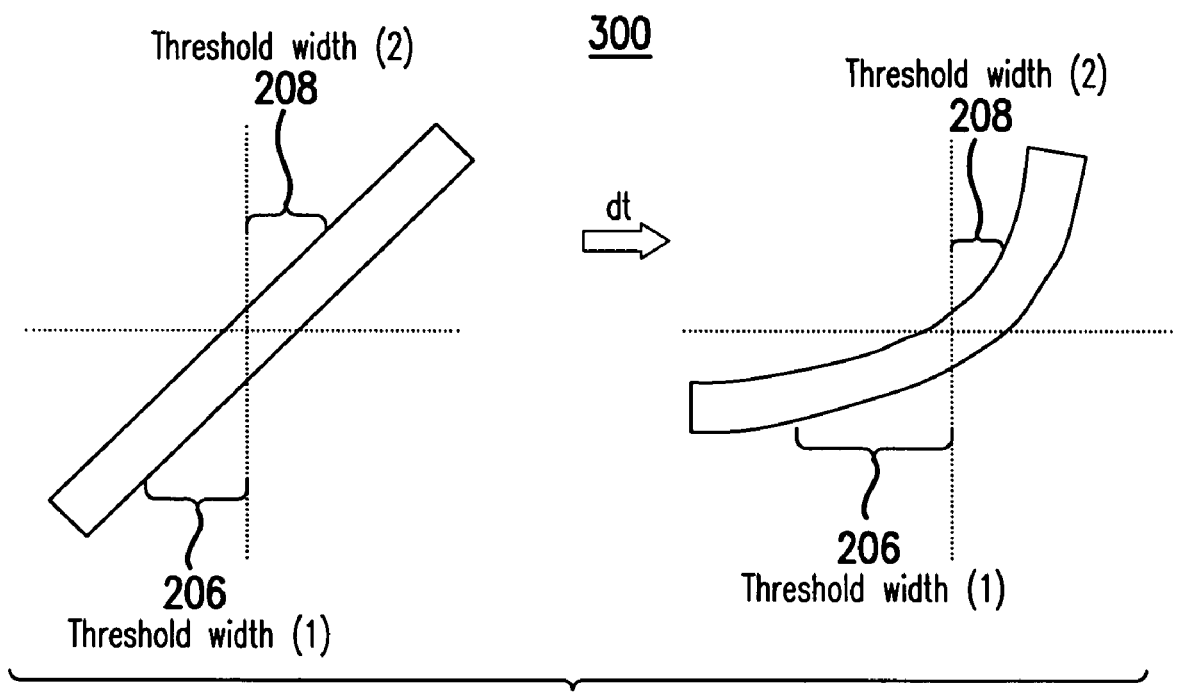
FIG. 3 illustrates a graphical representation of how a blade might be affected by engine instability and the resulting effect on the measured signature according to embodiments of the invention.

In various embodiments, the variance in threshold width is used to determine the operating condition of a turbine engine. In one embodiment, during a stall event the positive threshold width 206 behaves inversely to the negative threshold width 208. For example, due to various dynamic stresses as shown in the time-elapsed graphical representation 300 of FIG. 3, the negative threshold width 208 for a blade passage decreases abruptly during a "stall cell", or data segment during which an engine stall is observed, while the positive threshold width 206 increases. Further, such a variance in the threshold widths is also observable during pre-stall events, or events preceding the occurrence of a stall cell. As such, threshold width ratios may be used to predict stall situations. Experimentation has shown such data to be reliable in both clean and distorted inlet flow conditions.

Figure 4:
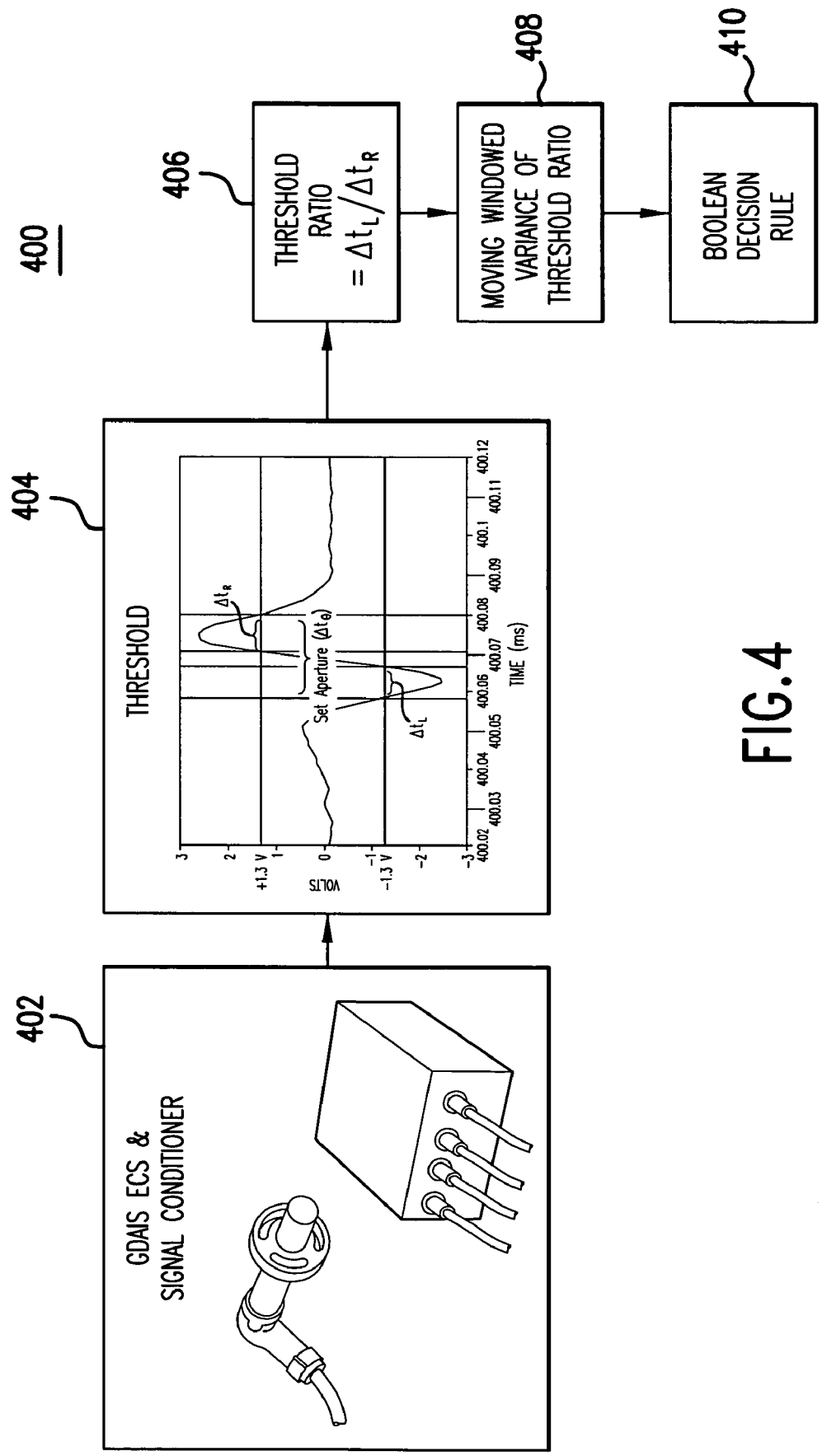
FIG. 4 illustrates a flow diagram of a turbine engine monitoring method according to embodiments of the invention.
Figure 5:
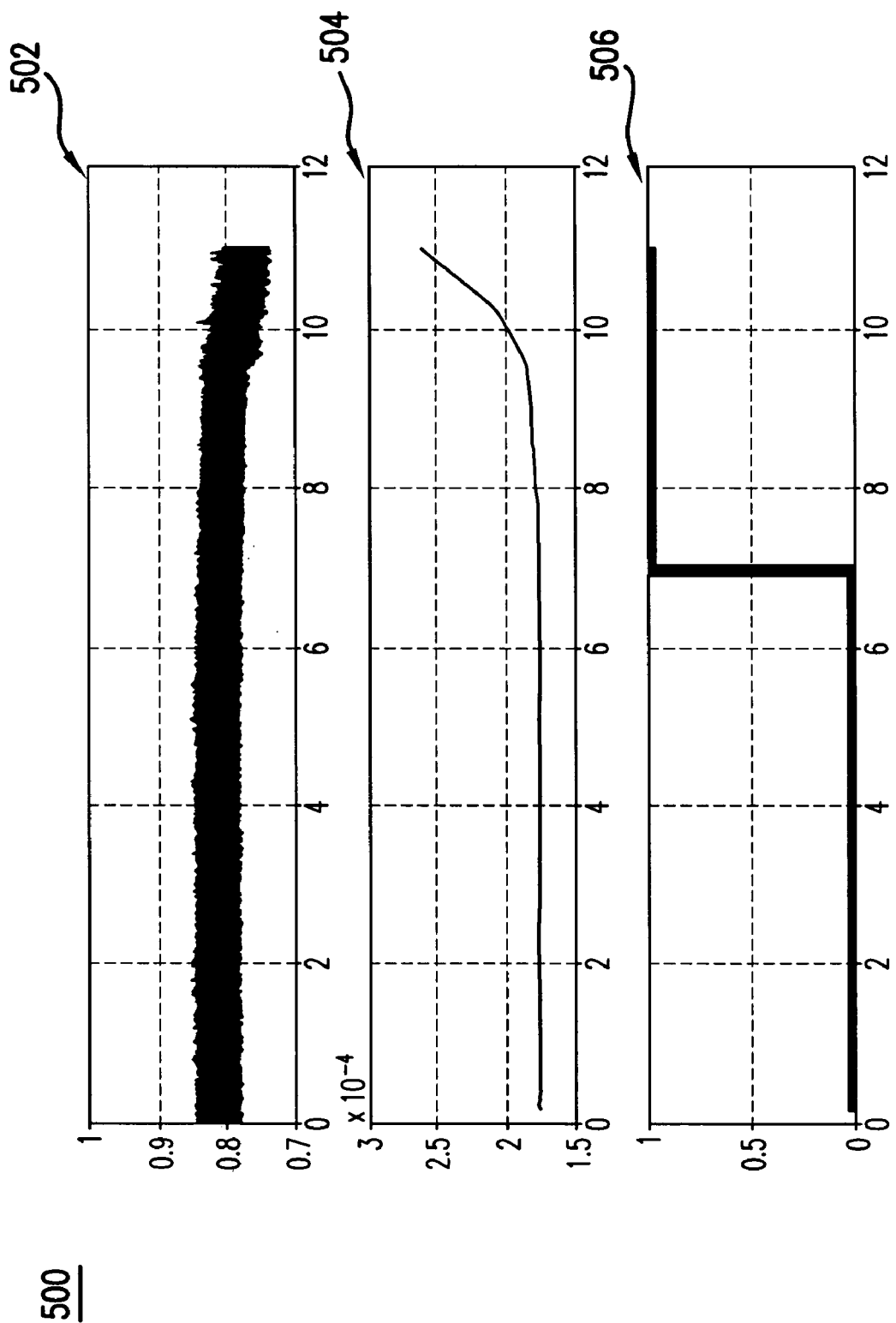
FIG. 5 illustrates a graphical representation of blade signature data according to embodiments of the invention.

As such, a turbine engine monitor may be utilized to determine the operating condition of a turbine engine by monitoring and processing threshold width ratios. In one embodiment, a turbine engine monitor may comprise an ECS 106 for sensing signature data for the passage of a plurality of blades 104 during a revolution of a turbine engine 100 and a processor 108 for receiving the signature data and determining an operating condition. FIG. 4 illustrates a flow diagram of the operation of a turbine engine monitor 400 wherein, an ECS 106 having a sensing field in communication with a plurality of rotating turbine blades 104 during a revolution of a turbine engine 100 generates signature data for the passage of each blade in step 402. Either internally or via the real-time communication link 110, the processor 108 receives the signature data from the ECS 106 and compares against defined threshold points value for the signature data at step 404. In some embodiments, the defined positive and negative threshold points are chosen such that they are sufficiently above the noise floor based on historical data. In step 406, the processor 108 identifies a plurality of positive threshold point pairs and a plurality of negative threshold point pairs to determine a plurality of negative threshold widths from a plurality of times elapsed between the negative threshold point pairs and a plurality of positive threshold widths from a plurality of times elapsed between the positive threshold point pairs. The positive lobe of the signature could be first or second depending on how the sensor is installed. Utilizing the defined threshold points and the signature data, the processor 108 may then determine a plurality of threshold ratios from the plurality of pairs of negative and positive threshold widths. In step 408, the processor 108 may monitor a time-elapsed or "moving windowed" variance of the threshold ratios to correlate a variance of the threshold ratios with a pre-selected threshold variance. The variance threshold is based on historical data in some embodiments. For example, a threshold variance greater than a previously observed threshold variance that has been shown to be indicative of a pre-stall operating condition may be pre-selected and the processor 108 may be programmed to alert a user when the threshold condition is met, such as in step 410. In other embodiments, a trend in the threshold variance is detected to declare a pre-stall condition. For example, in one embodiment, the slope of the variance is calculated and the average slope of the threshold variance is compared to a threshold. FIG. 5 illustrates a graphical representation 500 of raw signature data as captured by the ECS 502, the variance of threshold ratio as processed from the signature data received from the ECS 504 and the operation of a stall detector controlled by the processor 506 according to the process described in FIG. 4. In FIG. 5C, the detection of the pre-stall condition occurs when slope of the threshold ration starts to become positive.

In alternative embodiments, the processor 108 may determine the operating condition of an engine by employing an algorithm that takes into account the harmonic structure of the ECS signature data for a plurality of blades. For example, a wavelet or time-frequency transform of the signature data may be employed to determine an operating mode of an engine by allowing a processor 108 to differentiate between "normal" operating modes and pre-stall conditions. The fine-frequency fluctuations over time that are made quantifiable by a time-frequency transform are associated with the physical structure and motion of the plurality of fan blades within the sensing field. Therefore, physical changes or changes in the motion of the blades are represented by changes in the signature data.

In one embodiment, blade characteristic data may be extracted from signature data by utilizing a time-frequency transform and a frequency extraction method at a specific harmonic (or harmonics) of the signature data. For example, fluctuations around harmonics in a wavelet transform or WFFT (windowed fast Fourier transform) can be used to estimate instantaneous frequency or alternately, a direct FM method may be utilized to extract blade instantaneous frequency information from the signature data. I am not sure I understand what you were trying to say in the last sentence.

Figure 6:
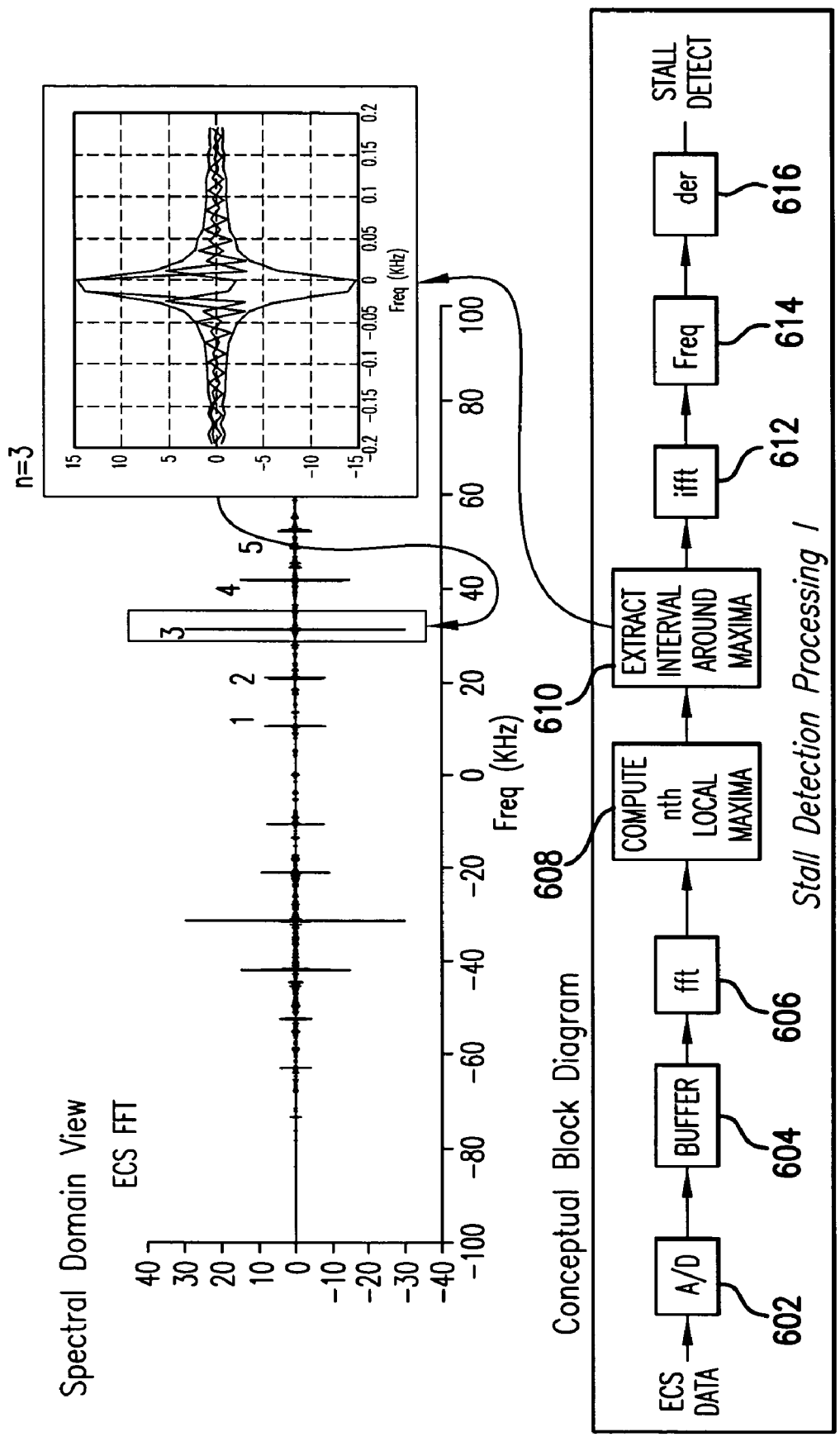
FIG. 6 illustrates a flow diagram of a turbine engine monitoring method according to embodiments of the invention.

FIG. 6 illustrates a flow diagram 600 of a direct FM algorithm for real-time detection of stall precursors. In step 602, signature data from the ECS is sampled by an A/D converter and a discrete batch of the signature data, buffered in step 604, is received by the processor 108. For example, the length of the time segment for each discrete batch of signature data may be pre-selected to limit the overall processing time of the algorithm and thus, to achieve real-time detection capabilities. Generally, a larger time segment will yield more accurate detection while a smaller time segment will lead to less delay in detection. In one embodiment, the magnitude of the time segment is directly related to the delay in obtaining the output signature data from the ECS.

In step 606, the processor 108 performs a fast Fourier transform on the sampled signature data and determines the frequency of a selected local maximum harmonic of the fast Fourier transform in step 608. In preferred embodiments, the third harmonic is chosen; however, other harmonics may also be selected. In step 610, the processor 108 selects a local frequency interval around the selected local maximum and performs an inverse fast Fourier transform on this frequency interval in step 612. The interval is selected such that there is sufficient bandwidth to contain the harmonic, but the interval is not larger than one harmonic. In an alternative embodiment, the processor 108 may perform a zero pad operation to the next highest power of 2 on the selected interval. "Zero padding" is operable to improve the performance of the fast Fourier transform because the transform is optimized to work on data sets that are powers of 2 in size; Sync interpolation provides higher resolution in the frequency domain but that is not necessary. The result of the inverse fast Fourier transform generates a complex frequency data sample at step 614 from which the processor 108 determines an angle at the complex frequency, which is given as:

$$\theta = \tan^{-1}(Im(x)/Re(x)).$$

At step 616, the processor determines the instantaneous frequency of the selected sample by taking a derivative of the angle data. The derivatives of a plurality of computed angles, the instantaneous frequency, can be utilized to determine a pre-stall engine operating condition. Alternatively, the processor 108 may take the derivative of the instantaneous frequency to determine a pre-stall engine operating condition. In one embodiment, the processor 108 may low pass filter and down-sample the instantaneous frequency to reduce the sampling rate.

Therefore, the embodiments described herein provide for determining the operating condition of a turbine engine. Particularly, the embodiments provide for monitoring a turbine engine by utilizing an eddy current sensor which determines an operating condition by having a sensing field in communication with a plurality of rotating turbine blades during a revolution of the turbine engine.

Although the invention has been described in terms of various embodiments, it is not limited thereto. Rather, the appended claims should be construed broadly to include other variants and embodiments of the invention which may be made by those skilled in the art without departing from the scope and range of equivalents of the invention.

What is claimed is:

1. A method of determining the operating condition of a turbine engine, said method comprising the steps of:
   providing a sensor having a sensing field in communication with a plurality of rotating turbine blades during a revolution of a turbine engine, wherein said sensor generates signature data for each of a plurality of blade passings;
   defining a threshold point value for said signature data;
   identifying a plurality of positive threshold point pairs;
   identifying a plurality of negative threshold point pairs;
   determining a plurality of first threshold widths from a plurality of times elapsed between said positive threshold point pairs;
   determining a plurality of second threshold widths from a plurality of times elapsed between said negative threshold point pairs;
   determining a plurality of threshold ratios from a plurality of pairs of positive and negative threshold widths; and
   correlating a variance of said threshold ratios with an operating condition of said turbine engine.

2. The method of claim 1, further comprising determining blade characteristic data from said signature data.

3. The method of claim 2, wherein said blade characteristic data comprises one of blade clearance, vibration, flutter and twist.

4. The method of claim 1, wherein the time difference between the outermost negative and positive threshold points, corresponding to signature data from a single blade comprise a sensor aperture.

5. The method of claim 1, wherein correlating said variance comprises comparing said variance to a pre-selected threshold variance.

6. The method of claim 1, wherein said variance of said threshold ratios is correlated by monitoring a trend in said variance of the threshold ratios.

7. The method of claim 6, wherein a slope of said variance is compared to a pre-selected slope threshold.

8. The method of claim 1, wherein said variance is indicative of a change in engine speed.

9. The method of claim 1, wherein said operating condition is an engine stall or surge condition.

10. A computer-readable medium having computer-executable instructions for performing steps comprising:
   receiving magnetic field signature data relating to passage of a plurality of rotating turbine blades during a revolution of a turbine engine;
   defining a threshold point value for said signature data;
   identifying a plurality of positive threshold point pairs;
   identifying a plurality of negative threshold point pairs;
   determining a plurality of positive threshold widths from a plurality of times elapsed between said positive threshold point pairs;
   determining a plurality of negative threshold widths from a plurality of times elapsed between said negative threshold point pairs;
   determining a plurality of threshold ratios from a plurality of pairs of positive and negative threshold widths; and
   correlating a variance of said threshold ratios with an operating condition of said turbine engine.

11. The computer-readable medium of claim 10, wherein said magnetic field signature data is provided by an eddy current sensor having a sensing field in communication with said plurality of rotating turbine blades.

12. The computer-readable medium of claim 10, further comprising determining blade characteristic data from said signature data.

13. The computer-readable medium of claim 12, wherein said blade characteristic data comprises one of blade clearance, vibration, flutter and twist.

14. The computer-readable medium of claim 10, wherein a time difference between the outermost negative and positive threshold point, corresponding to signature data from a single blade, corresponds to a passage of a single blade.

15. The computer-readable medium of claim 10, wherein correlating said variance comprises comparing said variance to a pre-selected threshold variance.

16. The computer-readable medium of claim 10, wherein said variance of said threshold ratios is correlated by monitoring a trend in said variance of the threshold ratios.

17. The method of claim 16, wherein a slope of said variance is compared to a pre-selected slope threshold.

18. The computer-readable medium of claim 10, wherein said variance is indicative of a change of engine speed.

19. The computer-readable medium of claim 10, wherein said operating condition is an engine stall or surge condition.

20. A turbine engine monitor, comprising:
   a sensor having a sensing field in communication with a plurality of rotating turbine blades during a revolution of a turbine engine, wherein said sensor generates signature data for a plurality of blade passings; and
   a processor for receiving said signature data from said sensor, defining a threshold point value for said signature data, identifying a plurality of positive threshold point pairs, identifying a plurality of negative threshold point pairs, determining a plurality of positive threshold widths from a plurality of times elapsed between said positive threshold point pairs, determining a plurality of negative threshold widths from a plurality of times elapsed between said negative threshold point pairs, determining a plurality of threshold ratios from a plurality of pairs of positive and negative threshold widths, and correlating a variance of said threshold ratios with an operating condition of said turbine engine.

21. The turbine engine monitor of claim 20, wherein the sensor is an eddy current sensor.

22. The turbine engine monitor of claim 21, wherein said processor receives said signature data from said eddy current sensor via a real-time communication link.

23. A method of determining the operating condition of a turbine engine, said method comprising the steps of:
   providing a sensor having a sensing field in communication with a plurality of rotating turbine blades during a revolution of a turbine engine, wherein said sensor generates signature data for the passage of each blade;
   determining blade characteristic data from said signature data; and
   determining the operating condition of said turbine engine from said blade characteristic data, wherein determining said blade characteristic data comprises a direct frequency modulation analysis comprising the steps of:
   performing a fast Fourier transform on said signature data;
   determining a frequency of a local maximum harmonic of said fast Fourier transform;
   selecting a frequency interval around said maximum;
   performing an inverse fast Fourier transform on said frequency interval;
   generating a complex frequency signature from said inverse fast Fourier transform;
   determining an angle at each complex frequency wherein said angle is given as $\theta = \tan^{-1}(Im(x)/Re(x))$ determining an instantaneous frequency by taking a derivative of each of said angles; and
   determining an operating condition of said engine from said instantaneous frequency.

24. The method of claim 23, wherein said engine operating condition is a stall or surge condition.

25. The method of claim 23, further comprising determining an operating condition of said engine from a derivative of said instantaneous frequency.

26. The method of claim 23, further comprising the steps of:
   performing at least one of a zero pad operation, low pass filtering and down-sampling said frequency interval, wherein said low pass filtering and down-sampling reduces an instantaneous frequency sampling rate.

27. The method of claim 23, wherein the sensor is an eddy current sensor.

28. The method of claim 27, wherein the eddy current sensor is a two pole eddy current sensor.

29. A computer-readable medium having computer-executable instructions for performing steps comprising:

receiving magnetic field signature data relating to a plurality of blade passings for a plurality of rotating turbine blades during a revolution of a turbine engine;

performing a fast Fourier transform on said signature data;

determining a frequency of a local maximum harmonic of said fast Fourier transform;

selecting a frequency interval around said maximum;

performing an inverse fast Fourier transform on said frequency interval;

generating a complex frequency signature from said inverse fast Fourier transform;

determining an angle at each complex frequency wherein said angle is given as $$\theta = \tan^{-1}(Im(x)/Re(x))$$

determining an instantaneous frequency by taking a derivative of each of said complex frequency angles; and determining an operating condition of said engine from said instantaneous frequency.

30. The computer-readable medium of claim 29, wherein said magnetic field signature data is provided by an eddy current sensor having a sensing field in communication with said plurality of rotating turbine blades.

31. The computer-readable medium of claim 29, wherein said engine operating condition is a stall or surge condition.

32. The computer-readable medium of claim 29, further comprising the step of determining an engine operating condition of said engine from a derivative of said instantaneous frequency.

33. The computer-readable medium of claim 29, wherein said engine operating condition is a stall or surge condition.

34. The computer-readable medium of claim 29, further comprising the steps of:

performing at least one of a zero pad operation, low pass filtering and down-sampling said frequency interval, wherein said low pass filtering and down-sampling reduces an instantaneous frequency sampling rate.

35. A turbine engine monitoring system, comprising:

a sensor having a sensing field in communication with a plurality of rotating turbine blades during a revolution of a turbine engine, wherein said sensor generates signature data for the passage of each blade; and a processor for determining blade characteristic data from said signature data and for determining the operating condition of said turbine engine from said blade characteristic data, wherein said processor determines said blade characteristic data by utilizing a direct frequency modulation analysis comprising the steps of:

performing a fast Fourier transform on said signature data;

determining a frequency of a local maximum harmonic of said fast Fourier transform;

selecting a frequency interval around said maximum;

performing an inverse fast Fourier transform on said frequency interval;

generating a complex frequency signature from said inverse fast Fourier transform;

determining an angle at each complex frequency wherein said angle is given as $$\theta = \tan^{-1}(Im(x)/Re(x))$$

determining an instantaneous frequency by taking a derivative of each of said complex frequency angles; and determining an operating condition of said engine from said instantaneous frequency.

36. The engine monitoring system of claim 35, wherein said engine operating condition is a stall or surge condition.

37. The engine monitoring system of claim 35, further comprising determining an operating condition of said engine from a derivative of said instantaneous frequency.

38. The engine monitoring system of claim 35, further comprising said processor for performing one of a zero padding operation, low pass filtering and down-sampling on said frequency interval; wherein said low pass filtering and down-sampling reduces an instantaneous frequency sampling rate.

39. The engine monitoring system of claim 35, wherein the sensor is an eddy current sensor.

40. A method for determining an operating condition of a turbine engine, said method comprising the steps of:

providing a sensor having a sensor field in communication with a plurality of rotary turbine blades during a revolution of a turbine engine, wherein said sensor generates signature data for each of the plurality of blade passes;

defining a threshold point value for the signature data;

defining a plurality of threshold point pairs;

determining a plurality of threshold widths based on a time elapsed between respective threshold point pairs;

detecting a trend in said plurality of threshold widths; and correlating said trend to an operating status of said engine.

41. The method of claim 40, wherein the sensor is a single pole sensor.

\* \* \* \* \*